United States Patent [19]
FitzGerald

[11] Patent Number: 5,571,018
[45] Date of Patent: Nov. 5, 1996

[54] ARRANGEMENT FOR SIMULATING INDIRECT FIRE IN COMBAT TRAINING

[75] Inventor: Mark R. FitzGerald, Phoenix, Ariz.

[73] Assignee: Motorola, Inc., Schaumburg, Ill.

[21] Appl. No.: 344,299

[22] Filed: Nov. 23, 1994

[51] Int. Cl.$^6$ ........................................ F41G 1/00
[52] U.S. Cl. ........................ 434/16; 434/11; 434/23; 102/355; 342/357; 342/386
[58] Field of Search ............. 434/11–27; 364/423, 364/578; 340/384.1, 384.3, 384.5, 385.1, 326; 342/357, 386, 387; 102/404, 355, 427; 367/129

[56] References Cited

U.S. PATENT DOCUMENTS

| 4,682,953 | 7/1987 | Doerfel et al. | |
|---|---|---|---|
| 4,744,761 | 5/1988 | Doerfel et al. | |
| 4,976,619 | 12/1990 | Carlson | |
| 5,292,254 | 3/1994 | Miller et al. | 434/11 |
| 5,382,958 | 1/1995 | FitzGerald | 434/23 X |
| 5,447,436 | 9/1995 | Campagnuolo et al. | 434/11 |
| 5,454,720 | 10/1995 | FitzGerald et al. | 434/27 |

FOREIGN PATENT DOCUMENTS

WO94/17358  8/1994  WIPO ..................... 434/11

*Primary Examiner*—Joe Cheng
*Attorney, Agent, or Firm*—Frank J. Bogacz

[57] ABSTRACT

An arrangement for simulating indirect fire in military combat training exercises in which each individual exercise participant is not required to be equipped with an individual position-locating device. The arrangement uses a technique of grouping (20, 30) the players (1–7,11–17) and equipping only one member of the group with a position-locating device (43). The position of the single player equipped with the position-locating device is used to determine if the group is located within the area affected by simulated indirect fire. Once the group has been determined to be within the affected area, individual players within the group assess their own casualties based on weapon-target pairing and random chance.

15 Claims, 3 Drawing Sheets

5,571,018

ARRANGEMENT FOR SIMULATING INDIRECT FIRE IN COMBAT TRAINING

BACKGROUND OF THE INVENTION

The present invention pertains to the simulation of the effects of indirect-fire weapons, such as artillery and mortars, in military combat training and more particularly to simulating effects on individual soldiers without requiring that each individual be equipped with a position-locating device.

Presently, two techniques for simulating area weapons effects are used. The first method currently in use is a centralized approach in which individual exercise participants or "players", either vehicles or individuals, are equipped with a positioning device such as a Global Positioning System (GPS) receiver, a two-way radio, and a processor. The position of the player is transmitted via the radio to a central exercise control center which maintains a database of current positions for all players. The control center receives indirect fire information from the firing unit and assesses casualties against those players within the designated target area. The casualty information is then transmitted over the radio to the players in the field and appropriate cues are activated on the affected players.

The second method of simulating indirect fire presently used is a decentralized approach. With this technique, each player is equipped with a positioning device such as GPS, a processor, and a radio which may be one-way or two-way. The exercise control center receives indirect fire information from the firing unit and broadcasts a message to all players giving the location and describing the type of weapon being simulated. This information is received by all players who then individually compare their positions to the target location and individually perform their own casualty assessments.

Each of the two presently used techniques requires that each individual player to be equipped with a positioning device, such as GPS or a multi-lateration receiver and a radio which typically interfaces to a sophisticated time-division multiplexed or cellular data link in addition to the processing unit. This complexity adds size, weight, and cost to the player equipment. This is a serious problem for the individual soldier who must mount and carry this equipment. In addition, the soldier must also carry batteries to operate the equipment. Rechargeable nickel cadmium batteries are expensive and heavy.

This invention provides an arrangement by which indirect fire can be simulated without requiring each player to be equipped with an individual position-locating device.

DESCRIPTION OF THE PREFERRED EMBODIMENT

Figure 1:
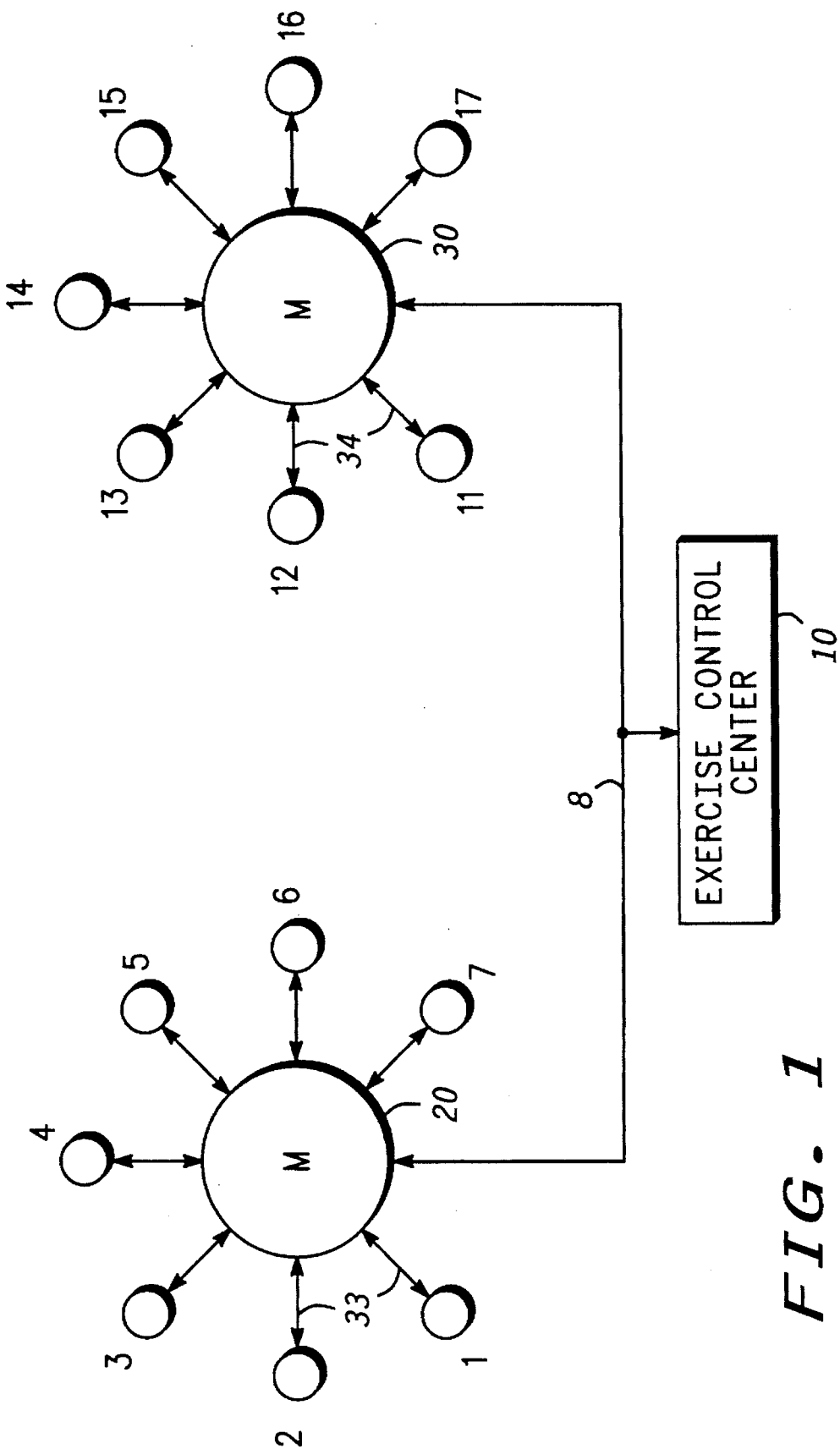
FIG. 1 is a block diagram of an indirect effect fire arrangement in accordance with the present invention.

FIG. 1 shows a block diagram of the preferred embodiment of the invention. It includes an Exercise Control Center 10, a Main Radio Data Link 8, Group Master Units 20 and 30, a Secondary Radio Data Links 33 and 34, and Individual Player Units 1, 2, 3, 4, 5, 6, 7, (group 20) and 11, 12, 13, 14, 15, 16, 17 (group 30).

The Main Radio Data Link 8 is a high-capacity two-way radio data link coupling the Group Master Units 20 and 30 to the Exercise Control Center 10. The Secondary Radio Data Links 33 and 34 are low-power, low-capacity two-way links coupling the Individual Player Units 1 through 7 and 11 through 17 to the Group Master Units 20 and 30, respectively.

Indirect fire simulations are initiated in the Exercise Control Center 10. Indirect fire simulation information including weapon type and target location is transmitted from the Exercise Control Center 10 to the Group Master Units 20 and 30 via the Main Radio Data Link 8. Group Master Units 20 and 30 contain an individual position-locating device such as GPS.

Each Group Master Unit 20 and 30 compares its position to the target location broadcast from the Exercise Control Center 10. If the Group Master Unit 20 or 30 determines its position to be within the area affected by the simulated indirect fire, it transmits a request for a time allocation on the Secondary Data Links 33 and 34 to the Exercise Control Center 10 via the Main Radio Data Link 8. The Exercise Control Center 10 then allocates a time slot on the Secondary Radio Data Links 33 and/or 34 and transmits this allocation to the requesting Group Master Unit 20 or 30 via the Main Radio Data Link 8. The requesting Group Master Unit 20 or 30 receives the time allocation from the Exercise Control Center 10 and at the appropriate time, transmits a message on the Secondary Radio Data Links 33 and/or 34 indicating that particular Group Master Unit 20 or 30 has determined that it is within the area of simulated indirect fire.

The message broadcast on the Secondary Radio Data Link 33 or 34 includes an identification of the Group Master Unit 20 or 30, and type of weapon being simulated. The Individual Players 1, 2, 3, 4, 5, 6, and 7 are programmed to respond to messages on the Secondary Radio Data Link 33 including the identification of Group Master Unit 20. Individual Player Units 11, 12, 13, 14, 15, 16, and 17 are similarly programmed to respond to messages on the Secondary Radio Data Link 34 containing the identification of Group Master Unit 30. Individual Player Units 1 through 7 and 11 through 17 receive the transmission from the Group Master Unit 20 or 30 via the Secondary Data Links 33 or 34. If the transmission includes the appropriate Group Master Unit identification, the Individual Player Units perform a casualty assessment on themselves based on the kill probability or the weapon type transmitted and random chance. Appropriate indicators or cues are then activated on the Individual Player Units to alert the user to simulated indirect fire activity and to provide annunciation of the casualty assessment.

In a time-ordered fashion based on the identification number of the Individual Player Unit 1 through 7 or 11 through 17, the affected Individual Player Units transmit over the Secondary Radio Data Links 33 or 34 a message including the results of the casualty assessment against that particular individual. The associated Group Master Unit 20 or 30 receives the transmissions from the Individual Player Units 1 through 7 or 11 through 17 and assembles a single message including the results of all of the assessments of the Individual Player Units in the group. This information is transmitted by the Group Master Unit 20 or 30 back to the Exercise Control Center 10 via the Main Radio Data Link 8 for exercise monitoring purposes.

Figure 2:
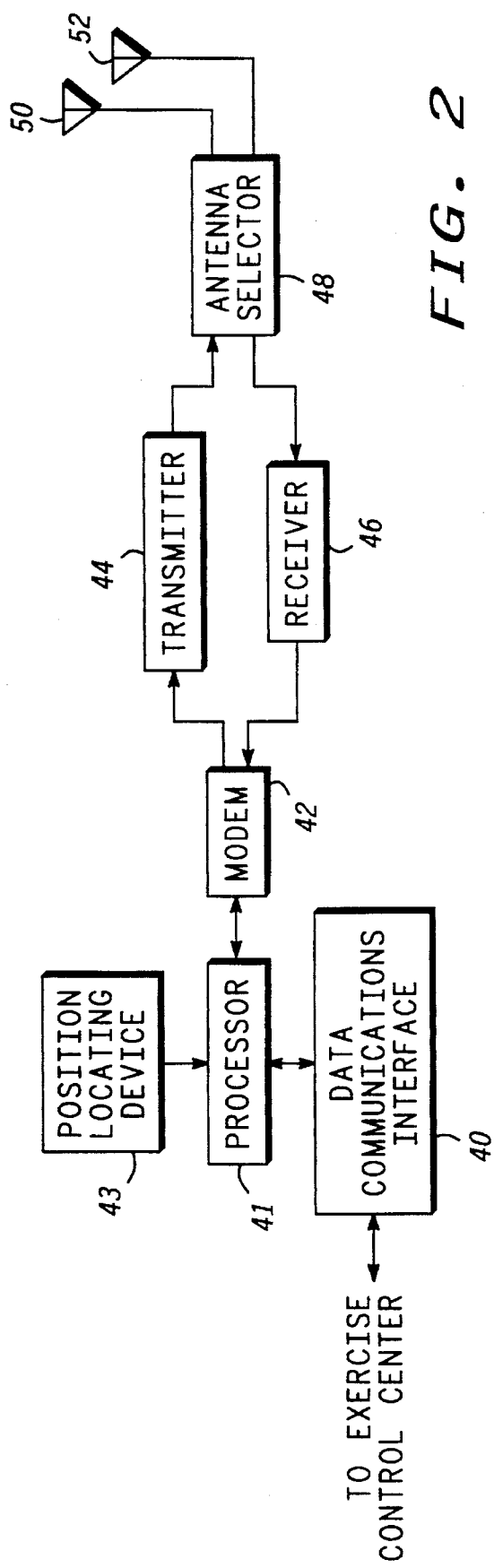
FIG. 2 is a block diagram of the Group Master Units of FIG. 1 in accordance with the present invention.

FIG. 2 shows a block diagram of the preferred implementation the Group Master Unit 20 or 30 of FIG. 1. Referring to FIG. 2, the Group Master Unit shown is configured to mount on a vehicle in which individual soldiers equipped with Individual Player Units may be riding. An example of such a vehicle would be an armored personnel carrier (APC) such as the American Bradley Fighting Vehicle. In addition, the Group Master Unit could be implemented in a man-pack on a dismounted soldier associated with a local commander. In such a configuration, the Group Master Unit is equipped with an internal antenna 50 to transmit and receive messages on the Secondary Radio Data Link 33 in FIG. 1 inside the vehicle in addition to an external antenna 52 to transmit and receive messages outside the vehicle on the Secondary Radio Data Link 33.

The vehicular configuration of the Group Master Unit also incorporates an Antenna Selector 48 to switch between the two Secondary Data Link antennas 50 and 52. When configured to be mounted on a dismounted soldier, the Group Master Unit would not incorporate the Antenna Selector 48 and the Internal Secondary Data Link Antenna 50.

Operation of the Group Master Unit 20 and 30 is as follows. The Data Communications Interface 40 receives radio transmissions including indirect fire simulation information via the Main Radio Data Link 8 of FIG. 1. The indirect fire simulation message is sent from the Data Communications Interface 40 to the Processor 41. The Processor 41 also receives information on its own location from the Positioning Device 43. The positioning device may include a GPS receiver or multi-lateration equipment or other suitable positioning system. The Processor 41 compares its position to the target area included in the indirect fire message and if within the area affected, the Processor 41 performs a casualty assessment against itself based on the type of weapon and its own player type. In the case in which the Group Master Unit 20 is a vehicle which may be carrying soldiers, if the vehicle is assessed as being hit, the Processor 41 will send a message to the MODEM 42 which produces a modulated signal which is sent to the Transmitter 44 and set the Antenna Selector 48 to select the Internal Antenna 50. The message transmitted via the Internal Antenna 50 contains the Group Master Unit identification and information indicating the kill probability to individual soldiers who may be riding inside it.

Since the signals broadcast on the Internal Antenna 50 will be limited to the inside of the vehicle by the metal structure of the vehicle itself, there is no danger of interference with other Group Master Units and no time allocation is required to broadcast on the Internal Antenna 50. This message is transmitted via the Internal Antenna 50 on the Secondary Data Link 33 of FIG. 1.

If there are Individual Player Units inside the vehicle, responses will be received from the Individual Player Units (discussed infra.) via the Secondary Link Internal Antenna 50 within a predetermined time interval. If these responses occur, they are received from the Internal Antenna 50 by the Receiver 46 and sent to the Processor 41 where they are accumulated into a single message. This single message, including all of the casualty assessments resulting from the simulated indirect fire is then sent to the Data Communications Interface 40 which transmits it via the Main Radio Data Link 8 of FIG. 1.

If no response from Individual Player Units is received via the Internal Antenna 50, Processor 41 of the Group Master Unit 20 transmits a message via the Data Communications Interface 40 over the Main Data Link 8 in FIG. 1. This message includes a request for a time allocation on the Secondary Data Link 33 of FIG. 1. A time allocation is received by the Data Communications Interface 40 and sent to the Processor 41. At the appropriate time, the Processor 41 switches the Antenna Select 48 to the External Antenna 52 and sends a message to the transmitter 44 which is broadcast outside the vehicle via the External Antenna 52 over the Secondary Data Link 33 of FIG. 1. This message includes the identification of the Group Master Unit and the type of weapon being simulated. Responses from the Individual Player Units are received by the External Antenna 52 and sent to the Receiver 46 which sends the messages to the Processor 41. The Processor 41 gathers all of the responses from the Individual Player Units and combines them into a single message to be sent by the Data Communications Interface 40 over the Main Radio Data Link 8 of FIG. 1.

Figure 3:
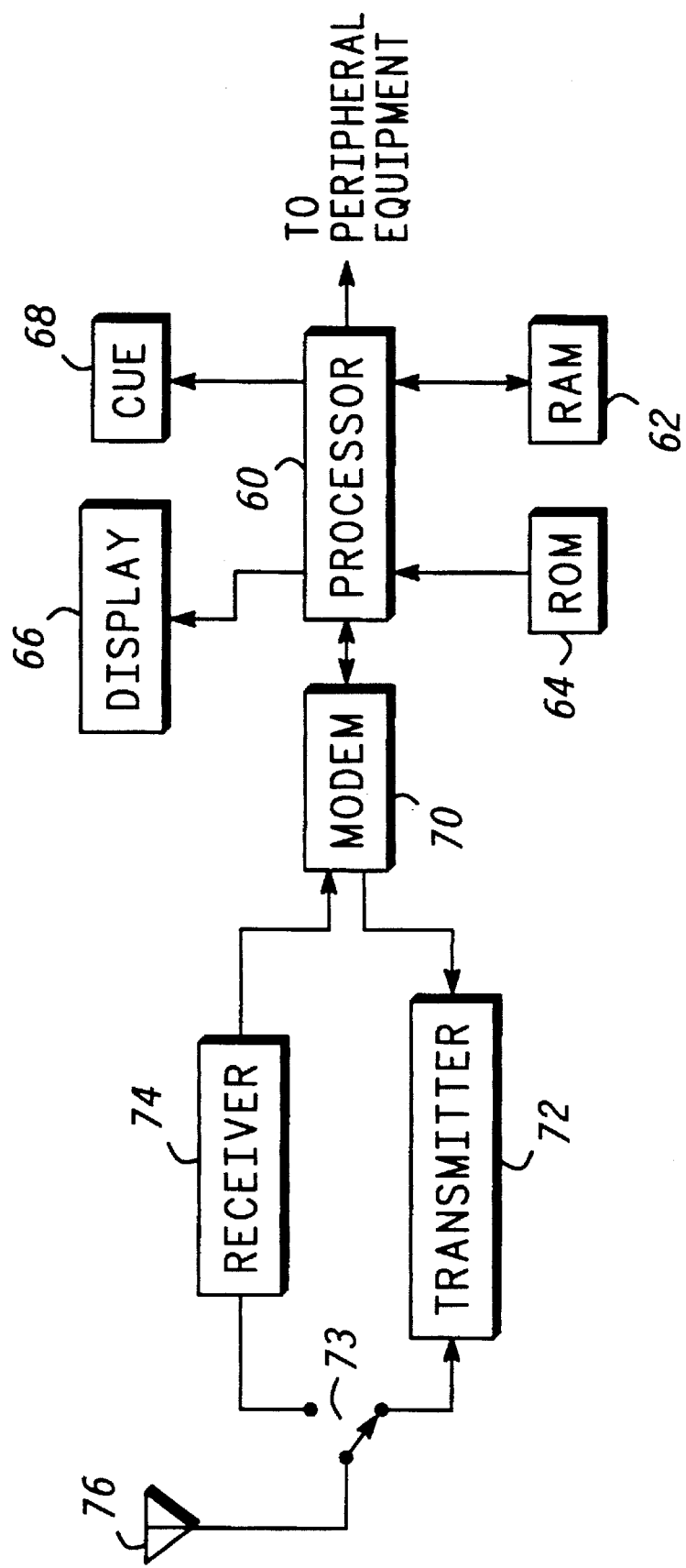
FIG. 3 is a block diagram of the Individual Player Unit in accordance with the present invention.

A block diagram of the preferred implementation of the Individual Player Unit is shown in FIG. 3. The Individual Player Unit Receiver 74 receives messages via the Secondary Radio Data Link 33 from the Antenna 76. These messages include indirect fire simulation information broadcast from a Group Master Unit 20 or 30 of FIG. 1. The message received is demodulated in the MODEM 70 and sent to the Processor 60. The Processor 60 interfaces to Read-Only Memory (ROM) 64 which holds its operating instructions and Random-Access Memory (RAM) 62 which is used for data and variable storage and player-specific operating parameters. The Processor 60 searches the received message for a Group Master Unit identification number which matches the number stored for this purpose in its RAM 62. This allows Individual Player Units to be addressed as groups corresponding to relevant military groupings, such as mechanized infantry squadrons.

If the message received includes a matching Group Player Unit number, the Processor 60 starts an internal timer and performs a casualty assessment based on either the weapon type or the kill probability received and random chance. The Processor 60 then activates the appropriate cue 68 which may be a buzzer or a light to alert the user, and also displays the casualty assessment and weapon category on the Display 66. If the Processor 60 determines the player to have been "killed", the Processor 60 transmits a message to any peripheral equipment, such as the soldier's weapon to deactivate it. When an internal timer in the Processor 60 reaches a predetermined count based on a previously programmed value, the Processor 60 sets the Transmit/Receive Switch 73 to Transmit and sends a message including the casualty assessment to the MODEM 70 which generates a modulated signal which is transmitted by the Transmitter 72 over the Secondary Radio Link via the Antenna 76.

This invention provides an arrangement by which indirect fire can be simulated upon a group of several exercise participants which may be either soldiers or vehicles while only requiring that one of the members of the group be equipped with an individual position-locating device and a radio link to the Exercise Control Center. By eliminating the need for all players to carry position-locating devices and Main Data Link Radios, the cost and amount and weight of equipment carried by the majority of players is significantly reduced. These factors are very important for the soldier in the simulated battlefield.

Although the preferred embodiment of the invention has been illustrated, and that form described in detail, it will be readily apparent to those skilled in the art that various modifications may be made without departing form the spirit of the invention or from the scope of the appended claims.

What is claimed is:

1. An arrangement for simulating indirect fire comprising:
   an exercise control center for initiating and controlling an indirect fire mission;
   a first data link for receiving and for transmitting messages, said first data link coupled to said exercise control center;
   a group master unit for determining a position relative to a target, said group master unit coupled via said first data link to said exercise control center;
   a plurality of individual player units for determining effects of said indirect fire mission on a corresponding troop, each of said plurality of individual player units coupled to said group master unit via a secondary data link;
   said group master unit transmitting said position relative to said target and transmitting indirect fire information, received from said exercise control center to each of said plurality of individual player units;
   each of said plurality of individual player units assessing casualties of said corresponding troop based on a location of said group master unit;
   each of said plurality of individual player units transmits said casualties to said group master unit; and
   said group master unit transmits to said exercise control center each of said casualties of said plurality of individual player units in a single message.

2. An arrangement for simulating indirect fire as claimed in claim 1, wherein said first data link includes a wireless data link.

3. An arrangement for simulating indirect fire as claimed in claim 2, wherein said wireless first data link includes a radio data link.

4. An arrangement for simulating indirect fire as claimed in claim 1, wherein said first data link includes a fiber optic data link.

5. An arrangement for simulating indirect fire as claimed in claim 1, wherein said first data link includes a wire line data link.

6. An arrangement for simulating indirect fire as claimed in claim 1, wherein said group master unit includes:
   a processor:
   a position location device for determining a position of said group master unit, said position location device coupled to said processor;
   a transmitter/receiver for transmitting messages to said plurality of individual player units, said transmitter/receiver coupled to said processor; and
   an antenna arrangement for transmitting said indirect fire information and said position of said group master unit to said plurality of individual player units and for receiving casualties of said plurality of individual player units, said antenna arrangement coupled to said transmitter/receiver.

7. An arrangement for simulating indirect fire as claimed in claim 6, wherein said group master unit further includes:
   a data communications interface for receiving said indirect fire information from said exercise control center and for transmitting said casualties to said exercise control center, said data communications interface coupled between said processor and said exercise control center; and
   a modem for modulating and demodulating signals, said modem coupled between said processor and said transmitter/receiver.

8. An arrangement for simulating indirect fire as claimed in claim 6, wherein said antenna arrangement includes an external antenna, said external antenna coupled between said transmitter/receiver and said plurality of individual player units.

9. An arrangement for simulating indirect fire as claimed in claim 8, wherein said antenna arrangement further includes:
   an internal antenna for communicating with said plurality of individual player units inside a vehicle, said internal antenna coupled between said transmitter/receiver and said plurality of individual player units; and
   an antenna selector for switching between said internal antenna and said external antenna, said antenna selector coupled to said transmitter/receiver, to said internal antenna and to said external antenna.

10. An arrangement for simulating indirect fire as claimed in claim 1, wherein each of said plurality of individual player units includes:
    a processor;
    a receiver/transmitter for receiving said indirect fire information and said position relative to said target, said receiver/transmitter coupled to said processor;
    an antenna for receiving and for transmitting, said antenna coupled to receiver/transmitter and to said group master unit; and
    a display for displaying results of said determined effects by each of said plurality of individual player units.

11. An arrangement for simulating indirect fire as claimed in claim 10, wherein each of said plurality of individual player units further includes a cue for visually and audibly indicating a casualty of said corresponding troop, said cue coupled to said processor.

12. An arrangement for simulating indirect fire as claimed in claim 10, wherein each of said plurality of individual player units further includes:
    read only memory for storing operating instructions for said processor, said read only memory coupled to said processor; and
    random access memory for storing variables and operating parameters, said random access memory coupled to said processor.

13. An arrangement for simulating indirect fire as claimed in claim 10, wherein each of said plurality of individual player units further includes a modem for modulating and demodulating signals, said modem coupled between said processor and said receiver/transmitter.

14. An arrangement for simulating indirect fire as claimed in claim 1, wherein there is further included:
    a plurality of group master units, each of said plurality of group master units for determining its position relative to said target, each of said plurality of group master units coupled via said data link to said exercise control center; and
    a plurality of individual player units correspondingly coupled to each of said plurality of group master units.

15. An arrangement for simulating indirect fire comprising:
    an exercise control center for initiating and controlling an indirect fire mission and for transmitting indirect fire information;
    a group master unit for determining a position of said group master unit relative to a target, said group master unit coupled to said exercise control center via a first data link;
    a plurality of individual player units for determining effects of said indirect fire mission on a corresponding troop, each of said plurality of individual player units coupled to said group master unit via a second data link, each of said plurality of individual player units being located within a approximately particular distance from said group master unit;

said group master unit transmitting said position relative to said target and transmitting said indirect fire information received from said exercise control center to each of said plurality of individual player units;

each of said plurality of individual player units transmitting a casualty assessment to said group master unit; and said group master unit transmitting said casualty assessment of each of said plurality of individual player units to said exercise control center in a single message.

* * * * *